(12) United States Patent
Senior et al.

(10) Patent No.: US 6,360,525 B1
(45) Date of Patent: Mar. 26, 2002

(54) COMBUSTOR ARRANGEMENT

(75) Inventors: Peter Senior, Kraainem (BE); Sebastian Maidhof, Florence (IT)

(73) Assignee: Alstom Gas Turbines Ltd. (GB)

( * ) Notice: Subject to any disclaimer, the term of this patent is extended or adjusted under 35 U.S.C. 154(b) by 0 days.

(21) Appl. No.: 09/297,857

(22) PCT Filed: Nov. 10, 1997

(86) PCT No.: PCT/GB97/03085

§ 371 Date: Oct. 20, 1999

§ 102(e) Date: Oct. 20, 1999

(87) PCT Pub. No.: WO98/21527

PCT Pub. Date: May 22, 1998

(30) Foreign Application Priority Data

Nov. 8, 1996 (GB) .............................................. 9623307

(51) Int. Cl.⁷ ................................................. F02C 7/26
(52) U.S. Cl. ...................... 60/39.06; 60/39.36; 60/747; 60/748
(58) Field of Search .................................. 60/39.06, 39.36, 60/746, 747, 748

(56) References Cited

U.S. PATENT DOCUMENTS

| | | | |
|---|---|---|---|
| 3,118,489 A | | 1/1964 | Anthes |
| 4,073,134 A | | 2/1978 | Koch |
| 4,144,710 A | | 3/1979 | Morishita et al. |
| 4,805,411 A | | 2/1989 | Hellat et al. |
| 4,827,724 A | | 5/1989 | Maghon et al. |
| 4,903,492 A | | 2/1990 | King |
| 4,991,398 A | * | 2/1991 | Clark et al. .................... 60/748 |
| 5,303,542 A | * | 4/1994 | Hoffa .......................... 60/39.06 |
| 5,400,587 A | * | 3/1995 | Keller et al. ................. 60/39.36 |
| 5,596,873 A | * | 1/1997 | Joshi et al. ..................... 60/737 |
| 6,058,710 A | * | 5/2000 | Brehm .......................... 60/747 |
| 6,070,412 A | * | 6/2000 | Ansart et al. .................. 60/747 |

FOREIGN PATENT DOCUMENTS

| | | |
|---|---|---|
| EP | 0 109 523 A1 | 5/1984 |
| EP | 0 276 397 A1 | 8/1988 |
| EP | 0 378 505 A1 | 7/1990 |
| EP | 0 542 044 A1 | 10/1992 |
| EP | 0 691 511 A1 | 1/1996 |
| FR | 2 266 803 | 10/1975 |

\* cited by examiner

*Primary Examiner*—Charles G. Freay
(74) *Attorney, Agent, or Firm*—Kirschstein, et al.

(57) ABSTRACT

A combustor for a gas turbine engine comprises an annular combustion chamber having radially outer and inner rows of fuel injectors disposed concentrically in the combustor head wall. Injectors in one of the rows are in angular registration with spaces between injectors in the other row. Each fuel injector produces a fuel/air mixture having a swirling motion, and has a downstream mixing duct. Each mixing duct opens into the combustion chamber through the combustor head wall and has a length sufficient to allow at least partial mixing of the fuel/air mixture before entry to the combustion chamber as a divergent swirling stream. Mixing ducts in the first and second rows of injectors have longitudinal centerlines oriented to coincide with generating rays of respective first and second imaginary conical surfaces. These conical surfaces intersect at an included angle within a primary combustion zone in the combustion chamber, whereby injectors located in different rows are angled towards each other in the downstream direction and the divergent swirling streams of fuel/air mixture coming from different rows cross in the combustion chamber in an interdigitating manner. This creates a strong mixing interaction between the streams from different rows and enhances uniformity and rapidity of combustion in the primary combustion zone.

9 Claims, 9 Drawing Sheets

| MODEL NO. | SWIRL CONFIGURATION | GEOMETRY | FIGURE NO. |
|---|---|---|---|
| 1 |  | STRAIGHT | 5A |
| 2 |  | STRAIGHT | 5B |
| 3 |  | ANGLED | 6A |
| 4 |  | ANGLED | 6B |
| 5 |  | ANGLED | 6C |
| 6 |  | ANGLED | 6D |
| 7 |  | ANGLED | 6E |
| 8 |  | ANGLED | 6F |
| 9 |  | ANGLED | 6G |

COMBUSTOR ARRANGEMENT

BACKGROUND OF THE INVENTION

1. Field of the Invention

This invention relates to combustors for gas turbine engines, including the associated fuel burners, otherwise known as fuel nozzles or injectors. It particularly, but not exclusively, relates to combustors suitable for operating in a so-called "low emissions combustion mode" because they can sustain a premixed lean-burn combustion processes.

2. Description of the Related Art

Some known types of combustor utilize a premixed lean-burn combustion mode to reduce emissions of pollutants—such as nitrous oxides ("NOx"), carbon monoxide ("CO") and unburned hydrocarbons ("UHC")—by enabling combustion temperatures to be kept within certain limits known to minimize pollutant production. To achieve such a low emissions combustion mode, air is mixed with the fuel before initial injection of the fuel/air mixture into a combustion zone in the combustion chamber. The term "lean-burn" implies that the amount of air mixed with the fuel is more than that required for complete combustion of the fuel.

Gas turbine engines operate over a wide range of engine speed and load conditions, varying from initial start-up conditions, through various engine speed/load combinations up to a maximum. When an engine's combustor is operating in a premix lean-burn low emissions combustion mode, it is well known that flame stability is difficult to achieve in the lower power ranges, because the combustion process is being operated close the weak extinction limit of the air/fuel mixture. An associated problem is non-uniformity of the combustion process, leading to undesirable variation in the temperature and composition of the combustion products leaving the primary combustion zone and increased temperature gradients in the combustor walls nearest the combustion process. Such non-uniform combustion is caused by insufficiently rapid homogenization of the fuel/air mixture before it ignites in the flame front established in the combustion chamber.

A well known way of stimulating good mixing of air and fuel is to impart a swirling motion to the fuel and air, either before, during or after the injection of fuel into an airstream. Published European patent specification EP 0 378 505 B1 discloses how, in an annular combustion chamber, fuel injectors having associated air swirlers can be used to project fuel and air along or parallel to the axial centerline of the combustion chamber. The fuel injectors are arranged in radially inner and outer circumferentially extending tiers or rows in the combustor head and the fuel is mixed with the swirling air after the fuel leaves the ends of the injectors within the combustion chamber. The air swirlers associated with the injectors in one row swirl the air in one rotational direction, whereas the swirl imparted to the air by the air swirlers in the other row is in the opposing rotational direction. Additionally, the fuel injectors in each row are in angular registration with the gaps between injectors in the other row so that the fuel and air discharged from injectors in one row interacts with the discharge from two adjacent fuel injectors in the other row. This is said to establish a reinforced fuel/air swirl pattern in the front or head of the combustor for stabilizing the burning. However, the object of this prior invention is to increase the intensity of combustion in non-premixed diffusion controlled combustion processes, whereas for premixed lean-burn combustion processes aimed at reduced emissions, the combustion intensity has to be controlled within certain limits.

Stable premixed lean burn combustion can be extended into somewhat lower power ranges by the expedient of performing the combustion process in a number of stages, for example as shown in International patent publication number WO92/07221. This discloses a sequentially staged combustion process comprising primary, secondary and if necessary tertiary stages of combustion occurring in sequentially arranged combustion chambers, with the chamber containing the primary combustion zone feeding its combustion products into the secondary stage and so on. A disadvantage of such sequentially staged combustion processes is the extra length required of the combustor in order to ensure an adequately complete combustion process in each stage before further premixed fuel and air is added to the combustion products to initiate the next stage of combustion.

European patent publication EP 0728 989 A2, to the present assignee, discloses a lean burn combustor in which the main premixing fuel burner or injector comprises an annulus surrounding a central pilot fuel burner or injector. The main premixed fuel-lean fuel/air mixture is injected into the combustion chamber as an initial radially inwardly moving swirling flow which meets an axially directed airblast from the pilot burner. This enhances homogenization of the main fuel-lean fuel/air mixture when it enters the combustion chamber, and aids in avoiding its premature ignition. The pilot air-blast is configured to provide a region of sheltered combustion which supports the combustion process just downstream of the pilot burner and increases stability of the premixed lean burn combustion process at part power engine conditions. This arrangement facilitates a so-called "parallel staged" or "fuel staged" combustion process, in which both primary and secondary combustion processes take place at the same streamwise axial position, fuel being appropriately apportioned between the pilot and main burners according to a schedule of fuel flows against power level. Both a low emissions combustion mode over a wide power range and a relatively short combustion chamber are achieved. Nevertheless, the necessary proximity of the premixed lean-burn main flame and the fuel-rich pilot flame to the pilot burner tends to cause high temperatures in the exposed end of the pilot burner, and the fuel-rich pilot flame also causes the formation of some NOx at the low engine power levels for which it is used.

Of course, practical designs are inevitably a result of compromises between conflicting requirements, but it will be understood from the above that designs of relatively short combustors are required which facilitate not only stable low emissions combustion over a wide power range but also a uniform combustion process in a primary combustion zone which has adequate separation from the combustor head.

SUMMARY OF THE INVENTION

According to the present invention, a combustor for a gas turbine engine comprises an annular combustion chamber having radially inner and outer concentric walls and a combustor head wall at its upstream end, and a plurality of fuel injectors disposed in the combustor head wall, the fuel injectors being circumferentially spaced around the combustor head wall and disposed as a first radially outer row of injectors and a second radially inner row of injectors, the rows being concentric with the combustor head wall, the injectors in the first and second rows being disposed such that injectors in each one of the rows are in angular registration with spaces between injectors in the other row;

wherein each fuel injector comprises means for producing a fuel/air mixture having a swirling motion, and a mixing duct located downstream of the means for producing the fuel/air mixture, the mixing duct opening into the combustion chamber through the combustor head wall and having a length sufficient to allow at least partial homogenization of the fuel/air mixture before entry to the combustion chamber as a divergent swirling stream, the mixing ducts in the first and second rows of injectors having longitudinal axes oriented to coincide with generating rays of respective first and second imaginary conical surfaces, which conical surfaces intersect within a primary combustion zone in the combustion chamber, whereby mixing ducts located in different rows are angled towards each other in the downstream direction and the divergent swirling streams of fuel/air mixture coming from different rows cross in the combustion chamber in an interdigitating manner, thereby creating a strong mixing interaction between the streams from different rows and enhancing uniformity of combustion in the primary combustion zone.

As used above, the term "conical surfaces" includes the case where one, and only one, of the conical surfaces is in fact a cylindrical surface, a cylinder being defined as a cone whose apex is infinitely distant.

It is believed that the strong mixing interaction of the crossed interdigitated swirling streams is due to turbulent interference between the swirling motions of the streams' outer layers as they interact with each other. As it moves downstream, the turbulence also rapidly propagates transversely of the downstream direction to produce a substantially homogeneous fuel/air mixture with a desirable uniformity of the combustion products leaving the primary combustion zone. The turbulent interaction between the crossing streams of fuel/air mixture is presently believed most effective if the direction of swirl motion is opposite for adjacent injectors in each row. However, the invention also includes alternative second and third arrangements in which the direction of swirl motion is the same for streams coming from all the injectors, or in which it is the same for injectors in the same row as each other, but opposite for injectors in different rows. Currently, we believe that the third arrangement does not achieve such efficient mixing as the first and second, but may well facilitate better light-round of the annular combustor during the engine ignition sequence. For stationary land-based gas turbine engines, in which low emissions performance may be given precedence over good ignition characteristics, the first and second arrangements may be more advantageous, whereas for vehicular gas turbines, particularly aeroengines, the hoped for good ignition characteristics of the latter arrangement may be preferred.

Combustors designed in accordance with the invention, having a more uniform combustion process and temperature in the primary zone and downstream thereof, will therefore experience less severe temperature gradients in the combustor walls, particularly in the combustor head wall. This can facilitate a longer combustor wall life due to lower stresses in the wall materials. Furthermore, the way in which mixing ducts located in different rows are angled towards each other, as stated above, combines synergistically with the enhanced mixing action to reduce the length of the primary combustion zone, enabling use of a relatively short combustion chamber, thereby economizing on space, weight, cost of materials and amount of cooling air required for cooling the combustor wall.

The included angle between the first and second imaginary intersecting conical surfaces, hereinafter termed "the angle of intersection" may be chosen as a compromise between a wide angle and a narrow angle. A wide angle could lead to poor separation of the primary combustion zone from the combustor head wall and excessive impingement of the combustion process on the radially inner and/or outer walls of the combustion chamber. On the other hand, a narrow angle would substantially avoid such impingement but extend the primary combustion zone by weakening the mixing interaction between the streams, thus reducing the beneficial effects of combustion temperature evenness and also requiring a longer combustion chamber. In one example of the invention, the angle of intersection is between 30° and 50° (preferably 40°). However, the angle may be more or less than this range, depending on the combustion chamber's configuration and its desired dimensions.

A combustor designed in accordance with the invention can be operated in a parallel- or fuel-staged low emissions combustion mode over a wide predetermined power range. This can be achieved in the following way:

During operation over a high power part of the wide predetermined power range, the fuel/air ratio of each individual injector can be such that the fuel-air mixture it emits can support stable lean-burn combustion. In this case, the low emissions combustion mode can be sustained by supplying equal amounts of fuel to all the injectors.

During operation over the lower part of the wide predetermined power range, (i.e., while the engine power is being "turned up" to, or "turned down" from, high power operation) a plurality of injectors in at least one of the rows (the injectors of said plurality being equally spaced around the at least one row and interspersed with the other injectors in the row) are supplied with reduced quantities of fuel as compared with the other injectors. These reduced fuel injectors can have their individual fuel/air ratios reduced below the level where stable combustion can be maintained, while the other injectors are fueled at a level which supports stable combustion. By this means, the injectors with the greater fueling sustain the whole combustion process within the combustor, even though the fuel/air ratio averaged over all the injectors may be less than that required for stable combustion.

The divergent swirling streams issuing from the reduced fuel injectors act to dilute the fuel/air mixture which enters the primary combustion zone from the more highly-fueled injectors. In prior art parallel staged annular combustors, it is frequently found that such dilution quenches the combustion process during low power operation, leading to excessive production of CO and UHC, and unstable combustion. Consequently, the lean-burn combustion process has had to be used over a restricted power range. However, the present combustor is particularly advantageous when used in a premixed lean-burn parallel staged combustion process because the rapid mixing obtained in the primary combustion zone enables premixed lean-burn operation to be extended to lower powers than hitherto without development of unstable combustion and undesirable combustion products.

Conveniently, it may also be arranged that during operation of such a parallel staged combustor over a predetermined low-power range, in which an overall lean-burn combustion process would be too unstable, some of the fuel injectors are fueled such that they locally produce a fuel/air mixture which is richer than that used for the low emissions combustion mode. By this means, local hot flame pilot combustion processes occurs in the primary combustion zone to stabilize the overall combustion process during the transition between zero power and the low emissions combustion mode.

Although a combustor according to the present invention is particularly advantageous for enabling a gas turbine engine to operate with a predominantly premixed lean-burn combustion processes, the same principle of combustor construction can of course also be used for engines operating only with a diffusion flame combustion process. In this case, the invention can be used to reduce UHC's at low power, carbon production and temperature non-uniformity.

BRIEF DESCRIPTION OF THE DRAWINGS

Exemplary embodiments of the invention will now be described with reference to the accompanying drawings, in which.

DETAILED DESCRIPTION OF THE PREFERRED EMBODIMENTS

Figure 1A:
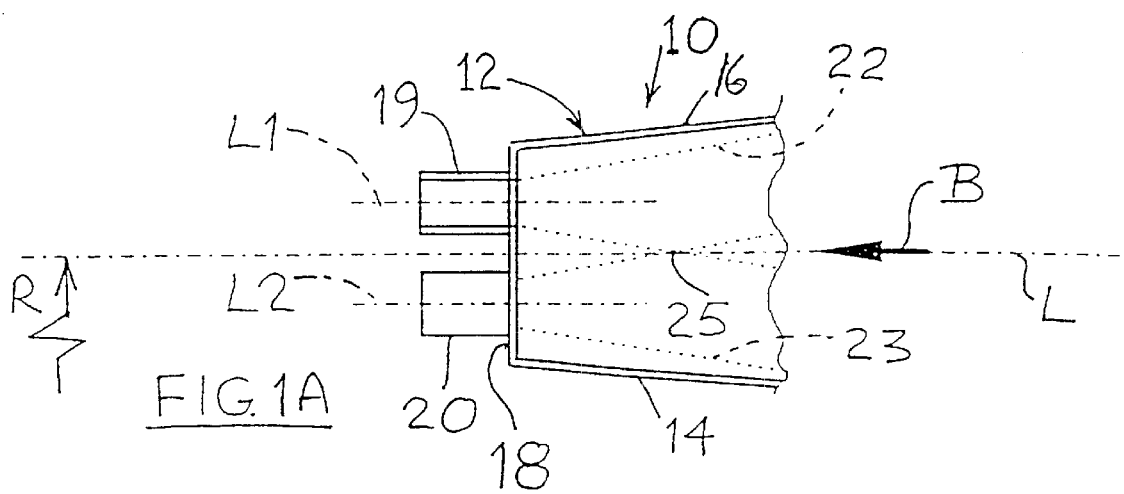
FIGS. 1A to 1C are diagrammatic representations of two embodiments of a prior art type of combustor.

FIG. 1A represents a sectional side elevation of the upstream portion of a prior art combustor 10 for an axial flow gas turbine engine (not shown). The combustor 10 comprises an annular combustion chamber 12 which is shown for convenience as having a longitudinal centerline L about which the chamber section is symmetrical. It will be realized that centerline L is in fact merely a representation of the cut surface of an imaginary cylinder having a radius R measured from the center of the engine, R being the median radius of the combustion chamber annulus. Combustion chamber 12 has radially inner and outer concentric walls 14 and 16 respectively and a combustor head wall 18 at its upstream end. FIG. 1A represents a view on section line A1—A1 in FIG. 1B, which is a partial end elevation of the combustor head wall 16 as seen from the direction of arrow B1 in FIG. 1A. Referring to these Figures, a plurality of fuel/air injectors 19, 20, comprise mixing ducts which are the downstream ends of respective fuel injector assemblies. The upstream portions of the injectors are not shown. The fuel injectors 19, 20 are circumferentially spaced around the combustor head wall 16 and disposed as a first radially outer row of injectors 19 and a second radially inner row of injectors 20, the rows being concentric with the combustor head wall. It should be noted that the longitudinal centerlines L1, L2 of the injectors 19, 20 extend parallel with the longitudinal centerline L of the combustion chamber section.

Injectors 19, 20 in the first and second rows are disposed relative to each other such that injectors in one of the rows are in angular registration with spaces between injectors in the other row. As indicated by the dotted triangles in FIGS. 1A and 1B, this disposition of the injectors produces a triangular arrangement of neighboring injectors in the two rows. For either one of the rows, any particular injector in that row is at the apex of an isosceles triangle, or a triangle approximating thereto, whose base line is defined by the neighboring two injectors in the other row.

Within the upstream portions (not shown) of each injector 19, 20 are fuel and air inlets and a fluid stream swirling device (as well known in the industry) which promotes mixing of the fuel and the air. The mixing ducts, comprising the illustrated downstream portions of the injectors 19, 20, open into the combustion chamber 12 through the combustor head wall 18 and have a length sufficient to allow at least partial homogenization of the fuel/air mixture before it enters the combustion chamber as respective divergent swirling streams 22, 23. Thus, the mixing process proceeds in the mixing ducts before entry of the swirling fuel/air mixture to the combustion chamber 12 and is approaching completion before ignition of the mixture at a flame front, preferably in a lean-burn combustion process. As indicated by the divergent dotted lines in FIG. 1A, the divergent swirling streams 22, 23 expand into the combustion chamber and at a position 25 downstream of the combustor head begin to interfere with each other in ways to be discussed with reference to FIGS. 5A and 5B.

Figure 1B:
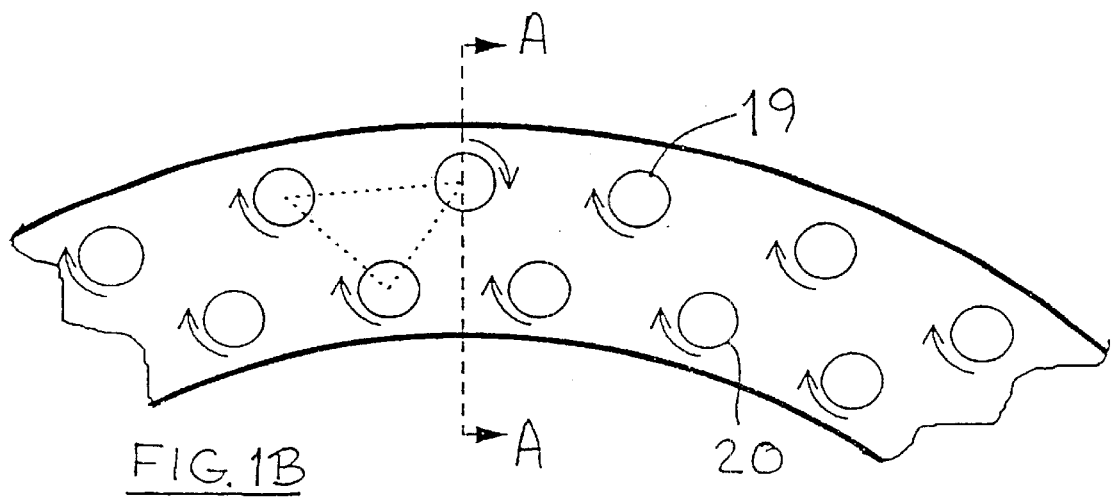
Figure 1C:
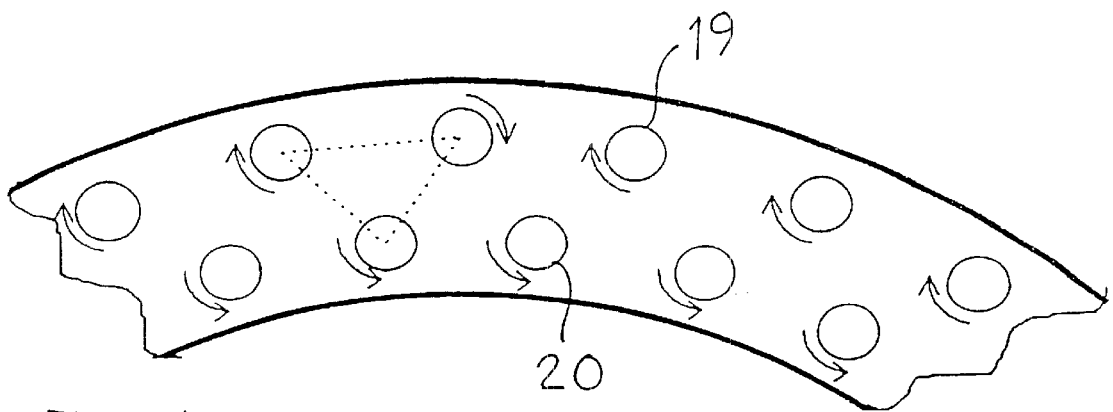

One factor having an influence on the mixing and combustion processes within the combustion chamber 12 is the direction of swirl in the fuel/air mixture as it enters the chamber. As indicated by the arrows, FIG. 1B illustrates the case in which the direction of rotation in both rows of injectors 19, 20 is the same, whereas in FIG. 1C the direction of rotation in one row of injectors 19 is opposed to that in the other row 20. In both rows, the direction of swirl is the same for all injectors in the same row. Note that oppositely swirling fuel/air streams in the same row are generally avoided because it has been found that such an arrangement results in excessive impingement of the combustion process on the inner and outer walls 14, 16 of the combustion chamber 12, due to expansion of the divergent streams 22, 23 preferentially where they come into contact, because the swirl directions of adjacent streams reinforce each other.

Figure 2A:
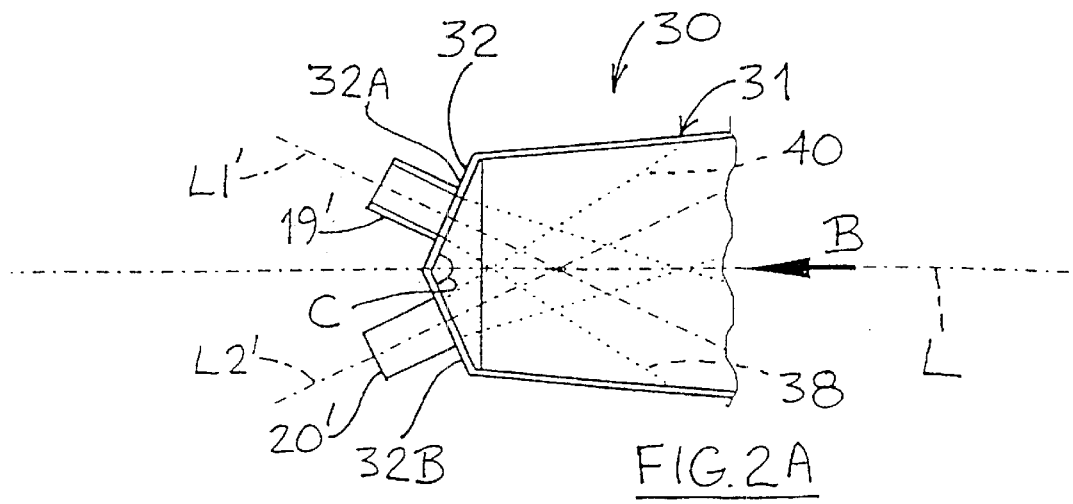
FIGS. 2A to 2C are diagrammatic representations of two embodiments of a combustor in accordance with the present invention.
Figure 2B:
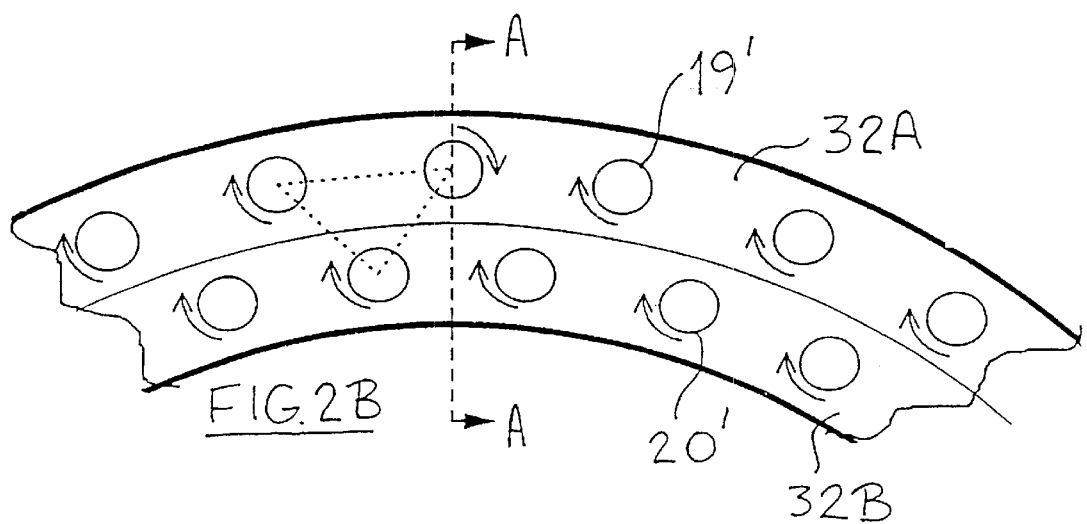
Figure 2C:
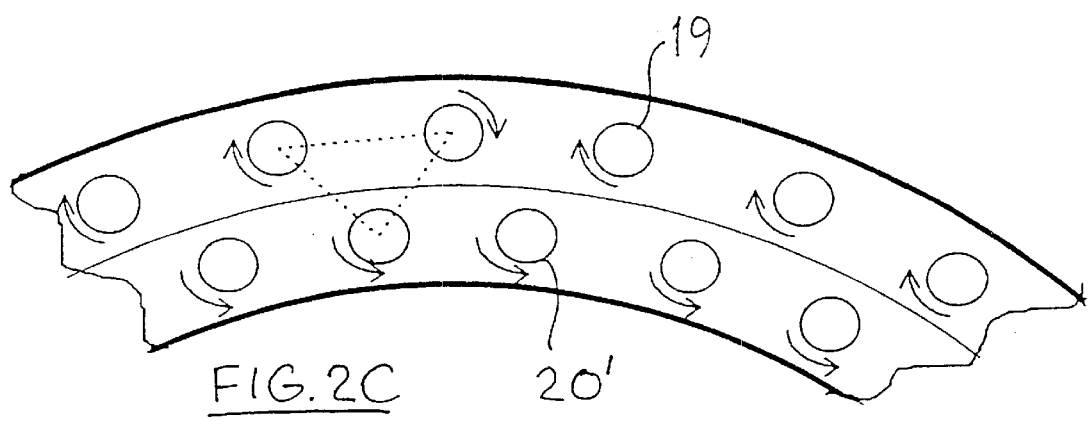

Referring now to FIGS. 2A to 2C, arrangements are shown which are in accordance with the invention as claimed. As in FIGS. 1A and 1B, FIGS. 2A and 2B comprise a side elevation on section line A—A and an end view on arrow B respectively. The combustor 30 differs from combustor 10 in FIG. 1 in that the combustion chamber 31 has a combustor head wall 32 comprising two portions 32A and 32B which are angled with respect to each other. Hence, in the radial section shown in FIG. 2A, the head wall appears as the two sides of a triangle defining an apex angle C. The two rows of injectors 19', 20' have substantially the same construction as those described for FIG. 1, and the two rows are disposed so that adjacent injectors in different rows form the previously described triangular configurations with respect to each other (see dotted lines in FIGS. 2B and 2C).

However, because the injectors 19', 20' penetrate the head wall 32 so that they are normal to their respective wall portions 32A, 32B, mixing ducts located in different rows are angled towards each other in the downstream direction. Consequently, their extended longitudinal centerlines L1', L2' cross each other in the primary combustion zone of the combustion chamber 31 in an interdigitating manner. This also means that the divergent swirling streams 38, 40 of fuel/air mixture coming from different injector rows 19', 20' respectively, cross bodily in the combustion chamber in the same interdigitating manner, thereby creating stronger mixing interaction between the streams from different rows than was the case for the arrangement in FIG. 1. This enhances uniformity of combustion in the primary combustion zone.

The turbulent mixing interaction is believed very satisfactory if the direction of swirl motion is the same for streams coming from all the injectors, as shown in FIG. 2B. However, it may be better for the light-round characteristics of the annular combustor (i.e., the speed and efficiency with which combustion propagates to all angular positions around the combustor at engine start-up) if the direction of swirl motion is the same for injectors in the same row as each other, but opposite for injectors in different rows, as shown in FIG. 2C.

Figure 3A:
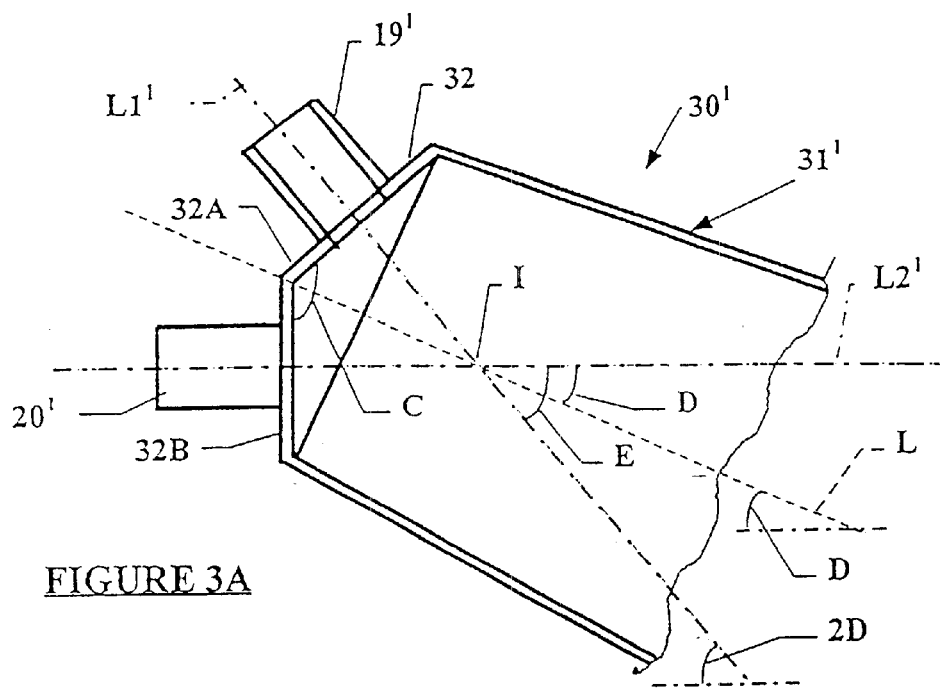
FIG. 3A is a view similar to FIG. 2A illustrating an alternative arrangement of the injectors relative to each other.

FIGS. 1A and 2A show situations in which the centerline L of the combustion chamber section extends parallel to the centerline of the gas turbine engine (not shown) in which they are situated. However, in many cases, particularly in engines for industrial or power generation use, their combustion chambers are arranged at an inwardly inclined angle to the engine's longitudinal centerline. This situation is illustrated in FIG. 3A, where the combustor 30' is structurally substantially the same as combustor 30 shown in FIG. 2A, but is canted downwards towards the engine centerline, so that the centerline L of the combustion chamber section makes an angle D therewith. In the special case shown, the cant angle D is chosen to be the same as the included angles which the extended longitudinal axes or centerlines L1' and L2' of the injectors 19', 20' make with the chamber section centerline L. As will be seen, this causes the centerlines L2' of injectors 20' to extend parallel to the engine centerline and causes the centerlines L1' of injectors 19' to make an included angle of intersection E (=2D) therewith. We believe that angle E should be between about 30° and about 50°, preferably about 40°.

In geometrical terms, the mixing ducts in the first and second rows of injectors 19', 20' have their longitudinal axes L1', L2' oriented to coincide with generating rays of respective first and second imaginary conical surfaces. In the special case shown in FIG. 3A, one of these imaginary surfaces happens to be a cylinder, whereas in FIG. 2A, both are truly conical, one conical surface being convergent in the downstream direction and the other being divergent downstream. In both FIGS. 2A and 3A, centerlines L1' and L2' lie in surfaces which intersect along a line comprising a circle, which is shown as point I in the combustion chamber section. Circle I extends around the annular combustion chamber within its primary combustion zone. This configuration causes mixing ducts located in different rows to be angled towards each other.

Figure 3B:
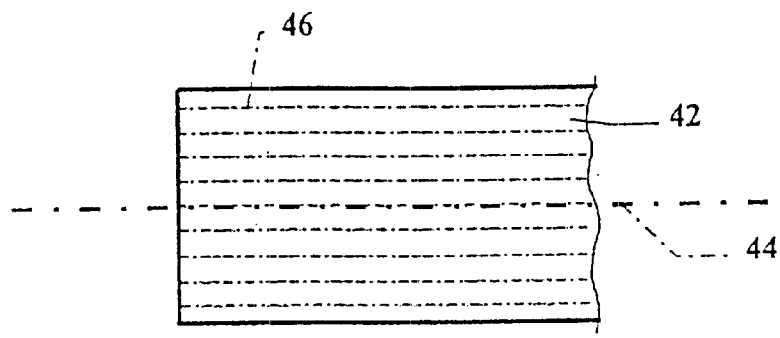
FIGS. 3B and 3C are diagrammatic representations on a reduced scale of geometrical considerations in the design of the combustor of FIG. 3A.
Figure 3C:
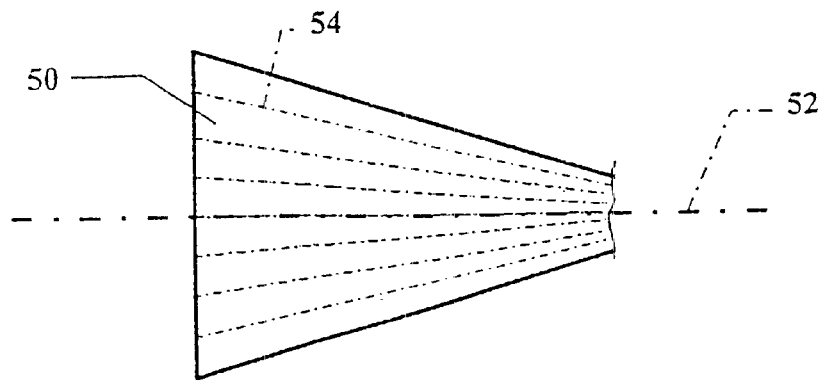

FIGS. 3B and 3C illustrate the above geometrical considerations diagrammatically in respect of FIG. 3A. In FIG. 3B, surface 42 has a rectangular shape and is a developed form of the end of a corresponding cylinder. The cylinder has been developed symmetrically about its former longitudinal axis 44 and the dashed lines 46 represent the generating rays of the original cylindrical surface. In terms of FIG. 3A, the longitudinal axis 44 represents the longitudinal centerline of the engine and the generating rays 46 represent the extended injector centerlines L2'. Surface 42 represents the developed surface of the imaginary cylinder in which the centerlines L2' lie.

Similarly, in FIG. 3C, surface 50 has a trapezium shape and is a developed form of the base part of a cone. The cone has been developed symmetrically about its former longitudinal axis 52 and the dashed lines 54 represent the generating rays of the original conical surface. In terms of FIG. 3A, the longitudinal axis 52 again represents the centerline of the engine and the generating rays 54 represent the extended injector centerlines L1', surface 50 representing the developed surface of the imaginary cone in which the centerlines L1' lie.

In FIGS. 2A and 3A, head wall portions 32A and 32B are equally but oppositely inclined with respect to the centerline L of the combustion chamber section, as are the centerlines L1', L2' of the injectors and the streams of fuel/air mixture issuing therefrom. Included angle C, defined by the meeting of the two combustor head wall portions 32A, 32B, is therefore bisected by combustion chamber centerline L and is the complementary angle to the angle of intersection E or 2D It may be appropriate under some circumstances for the injectors and/or the head wall portions to be somewhat differently inclined, so that the angles D and E-D in FIG. 3A would differ from each other instead of being the same. For instance, such an arrangement might be used to correct a tendency for the combustion process in the combustion zone to impinge too much on a particular part of the combustion chamber wall.

The reader will appreciate that the rows of injectors shown in FIG. 3A could be swirled and counter-swirled in the same way as shown and discussed in relation to FIGS. 2A to 2C.

To assess the effectiveness of various different injector swirl configurations when disposed in combustion chambers similar to those shown in FIGS. 1, 2 and 3, a series of computer simulations were performed using the proprietary computer program FLUENT version 4.32, available from Fluent Inc. of the United States of America. The simulations will be described in relation to FIGS. 4 to 6.

Figure 4:
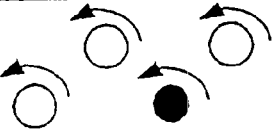
FIG. 4 is a table showing various arrangements of injectors in a combustor which were subject to computer simulation to investigate their effect on the combustion process.
Figure 4:
Figure 4:
Figure 4:
Figure 4:
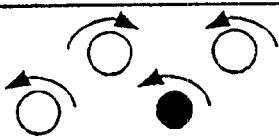
Figure 4:
Figure 4:
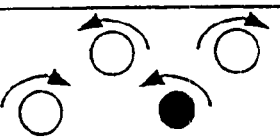
Figure 4:
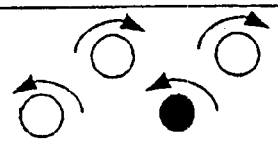
Figure 4:
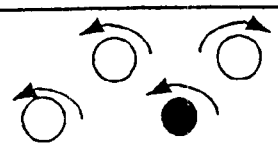

FIG. 4 is in the form of a table. Cells in the first column states the model number of the computer generated combustor configuration studied. The second column diagrammatically shows the directions of swirl of the streams of fuel/air mixtures issuing into the combustion chamber from groups of four injectors comprising pairs of adjacent injectors in both rows of injectors. The third column, headed "geometry", indicates whether the injectors for a particular model were "straight", i.e., oriented parallel to each other as in FIG. 1, or "angled", i.e., angled towards each other as in FIGS. 2 and 3. The fourth column refers the model number to a corresponding one of FIGS. 5A to 6G. Each of these Figures comprises a wire frame model defining a small sector of an annular combustor which contains two adjacent injectors in each of the two rows. Each wire frame model contains isotherm plots of combustion gas temperatures at five planes P1 to P5 equally spaced along the length of the combustion chamber. The whole length of the combustion chamber is shown as a wire frame, from the injectors and the head wall at the upstream end to the transition portion and the combustion nozzle at its downstream end.

It should be noted that for each model, column 2 of FIG. 4 shows the bottom right injector as a circle which is filled in and smaller than the others. This represents an injector which is supplied with no fuel during operation of the engine, only air. It is assumed that one in every two or four injectors in at least one of the rows are not supplied with any fuel, as would be the case at low powers. The relatively cool airstreams issuing from the unfueled injectors cause cool patches in the combustion gases which result from burning of the fuel/air mixture issuing from the other injectors. This renders the computer modeling more realistic by representing a "worst case" with respect to premixed lean burn parallel- or fuel-staged combustion processes. However, by increasing rapidity and completeness of mixing between the hot combustion gases and the cool airstreams, the present invention helps to prevent or reduce quenching of the combustion process and hence reduces unwanted emissions.

Figure 5A:
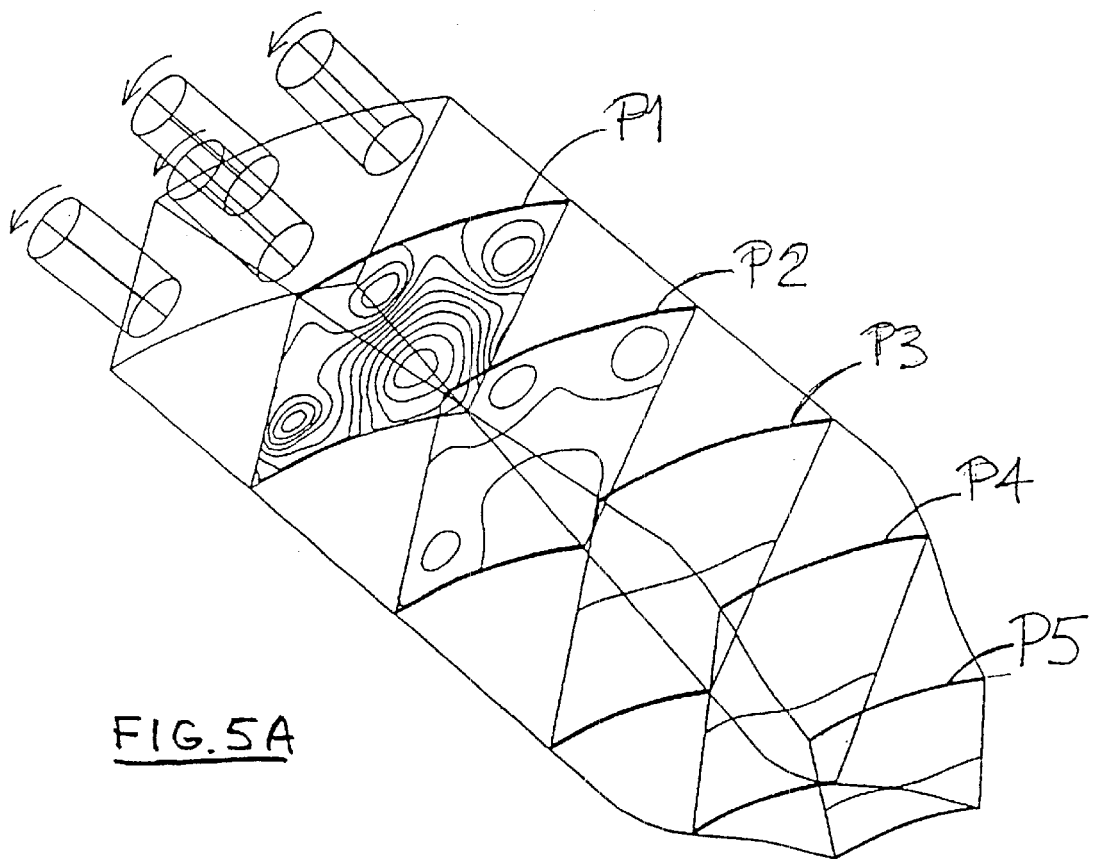
FIGS. 5A and 5B are computer-produced wire-frame models illustrating the relative combustion performances of prior art combustors like those shown in FIGS. 1A to 1C.

Referring to model 1, FIG. 5A, it will be seen that the combustor and injector swirl configuration is similar to that shown in FIGS. 1A and 1B, but with left-handed (anticlockwise) swirl for each injector in each row of injectors, instead of the right-handed (clockwise) swirl shown in FIG. 1B. For model 2, FIG. 5B, the injector swirl configuration is all right-handed, except for the bottom right injector, which has left-handed swirl.

Figure 6A:
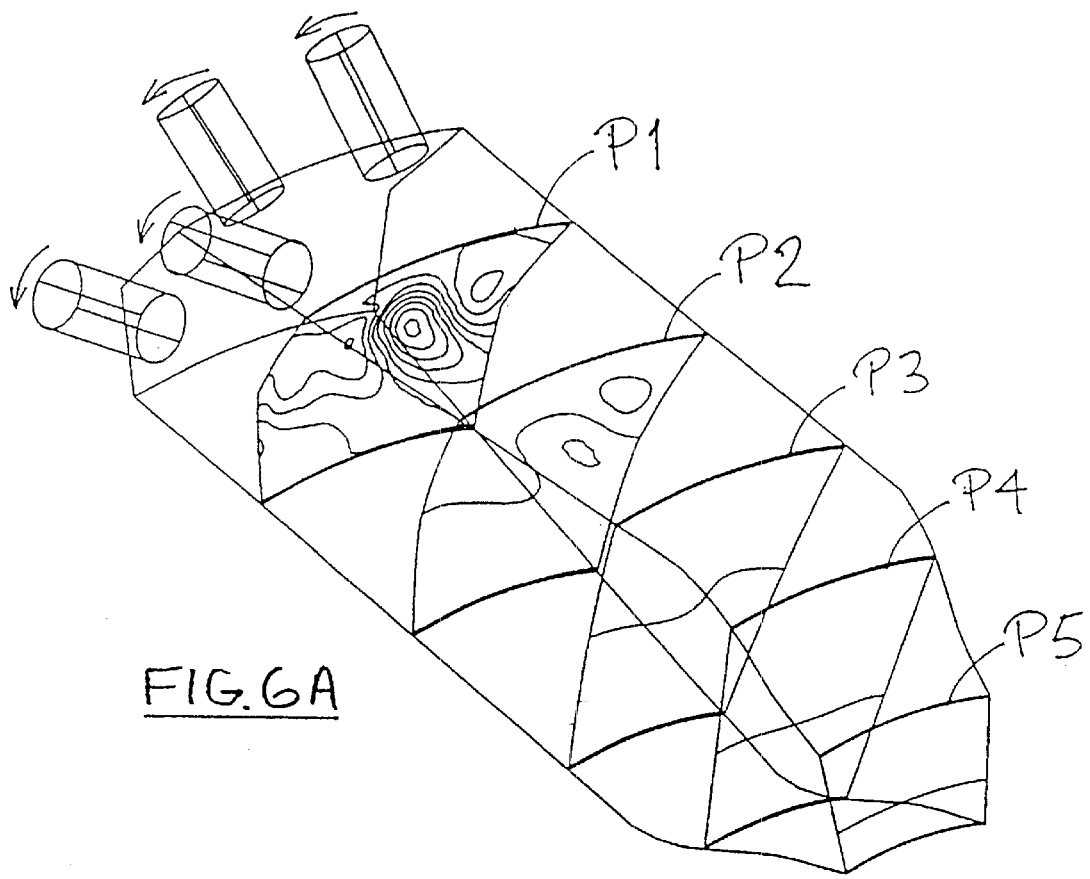
FIGS. 6A to 6G are computer-produced wire-frame models illustrating the relative combustion performances of combustors according to the invention, like those shown in FIGS. 2A to 2C and 3A.
Figure 6B:
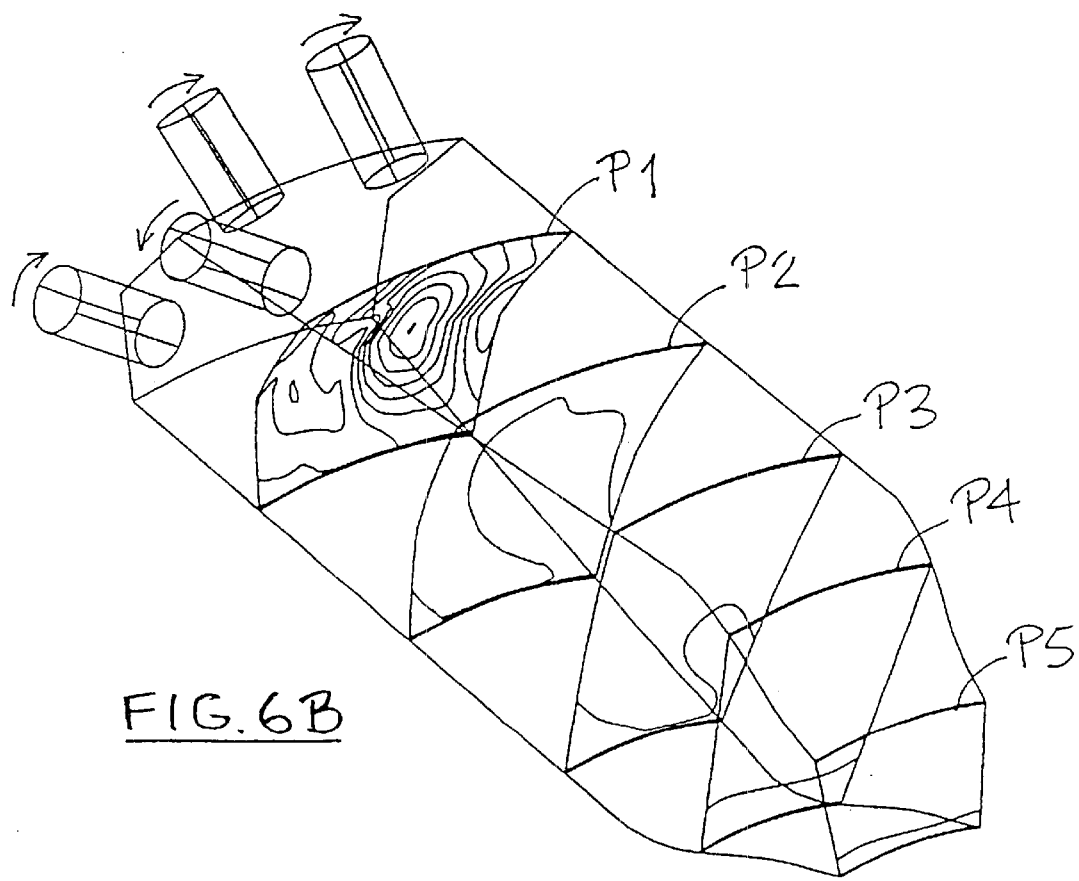
Figure 6C:
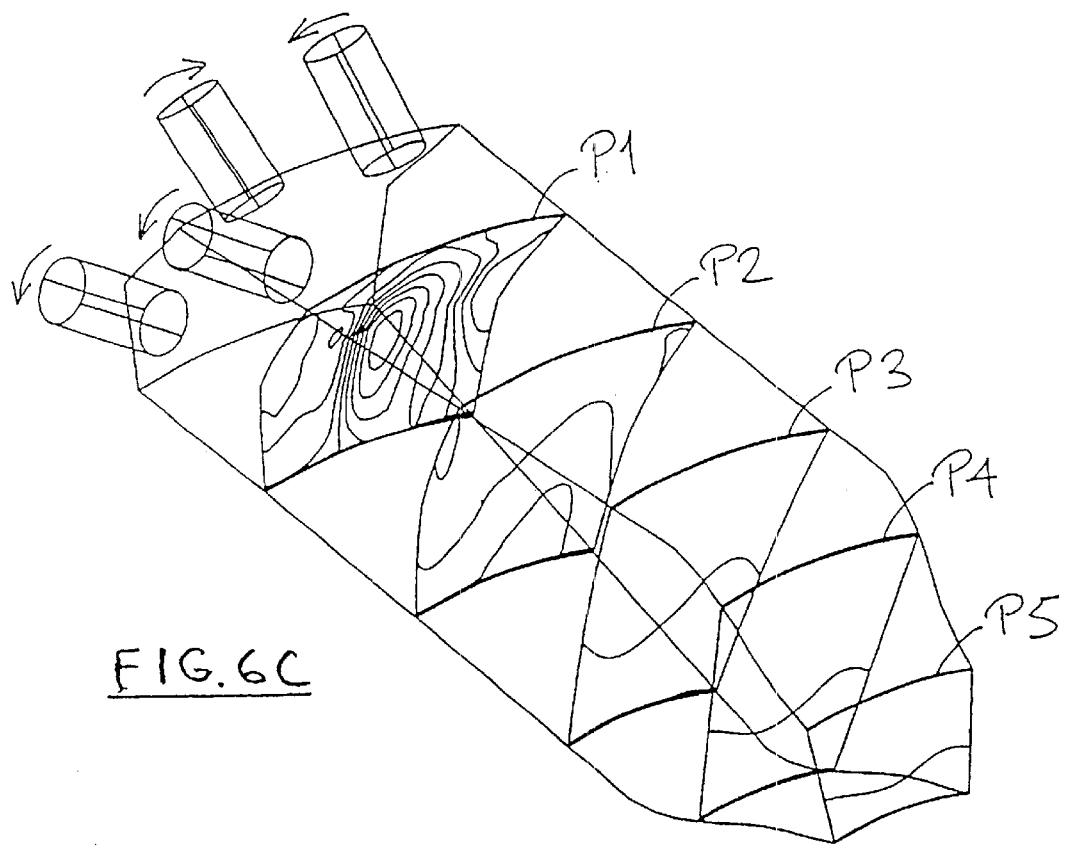

Model 3, FIG. 6A, shows a combustor with angled injectors and with a swirl configuration the same as model 1, i.e., similar to that shown in FIGS. 2A and 2B, but with left-handed swirl for each injector instead of the right-handed swirl shown in FIG. 2B. Model 4, FIG. 6B repeats the swirl configuration of model 2, but this time for angled injector geometry. In model 5, the swirls are left-handed except for the left injector in the top row, whereas in model 6, adjacent injectors in the same row have opposed swirls. Model 7 is a similar arrangement to model 6, but with directions of swirl for the injectors in the top row reversed. In model 8, the top row of injectors all have right hand swirl and the bottom row all have left hand swirl. Finally, model 9 shows all injectors with left hand swirl except for the top right injector, thereby representing an outer injector row in which adjacent injectors have opposed swirl.

Figure 5B:
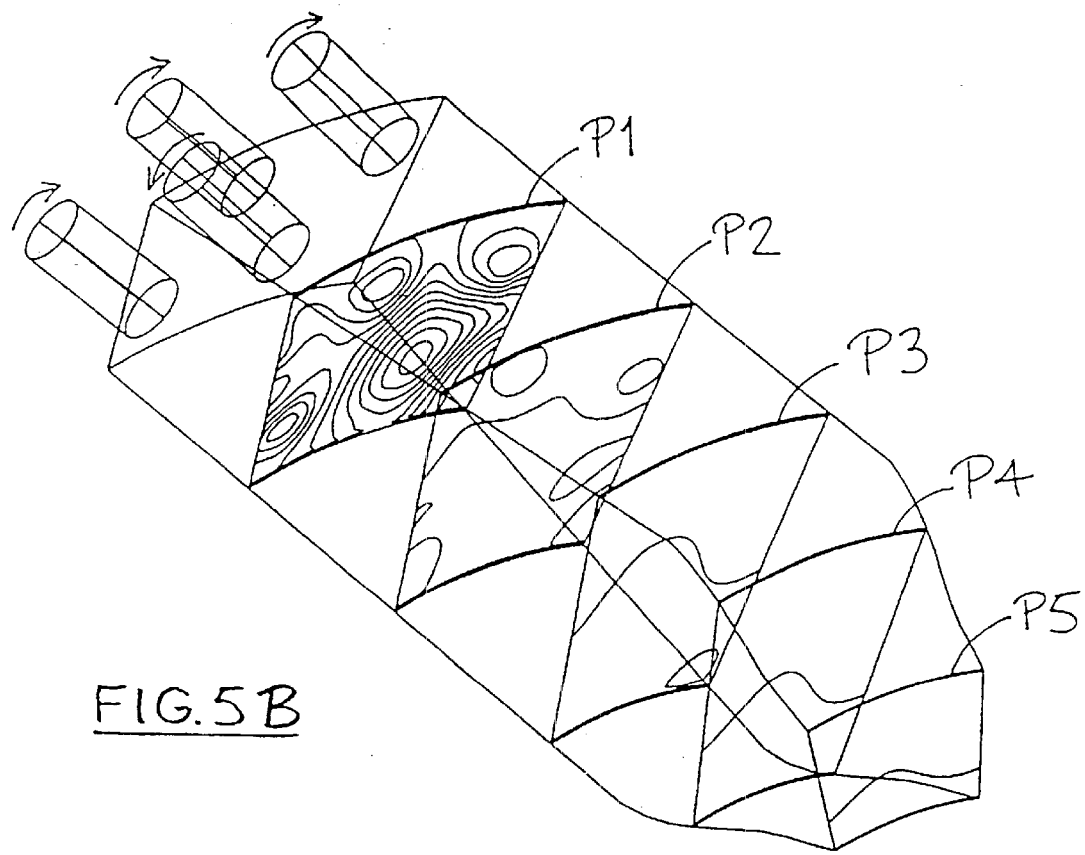

Comparing FIGS. 5A and 5B, it will be seen that the FIG. 5A configuration achieves the most even temperature distribution at the downstream end of the combustor, this being the configuration in which the injectors in both rows all have the same direction of swirl.

Figure 6D:
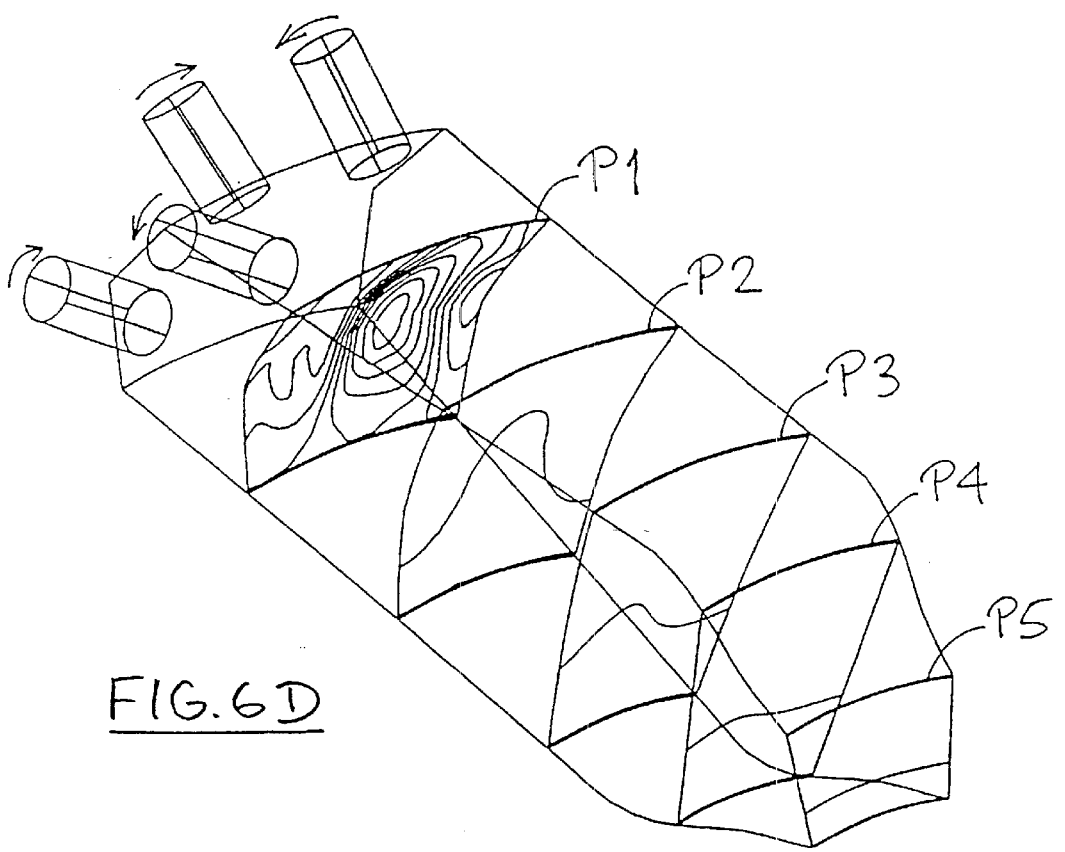
Figure 6E:
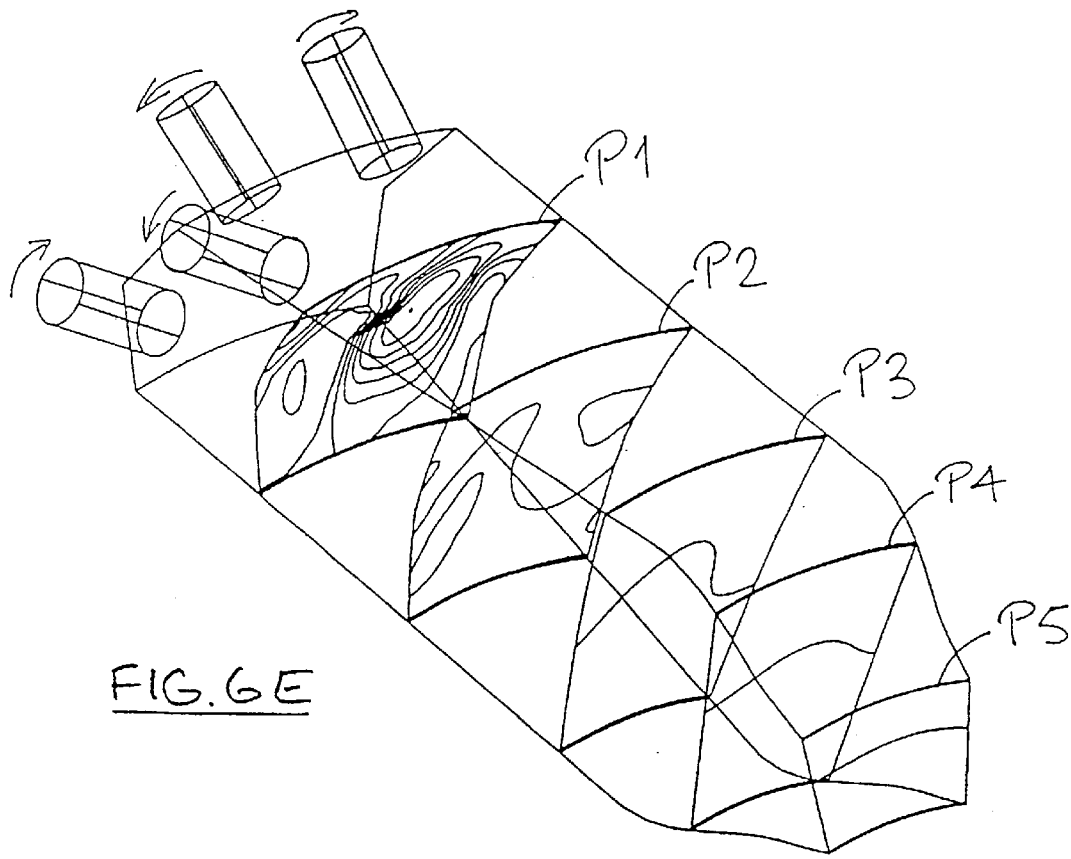
Figure 6F:
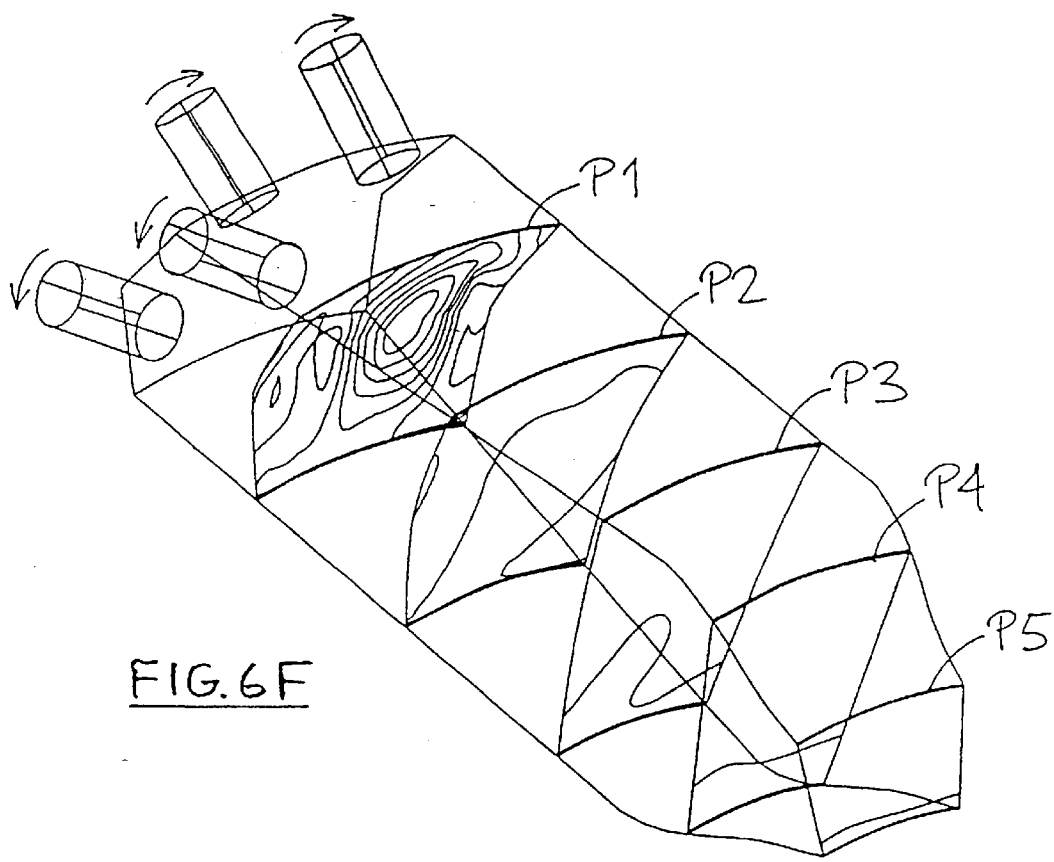
Figure 6G:
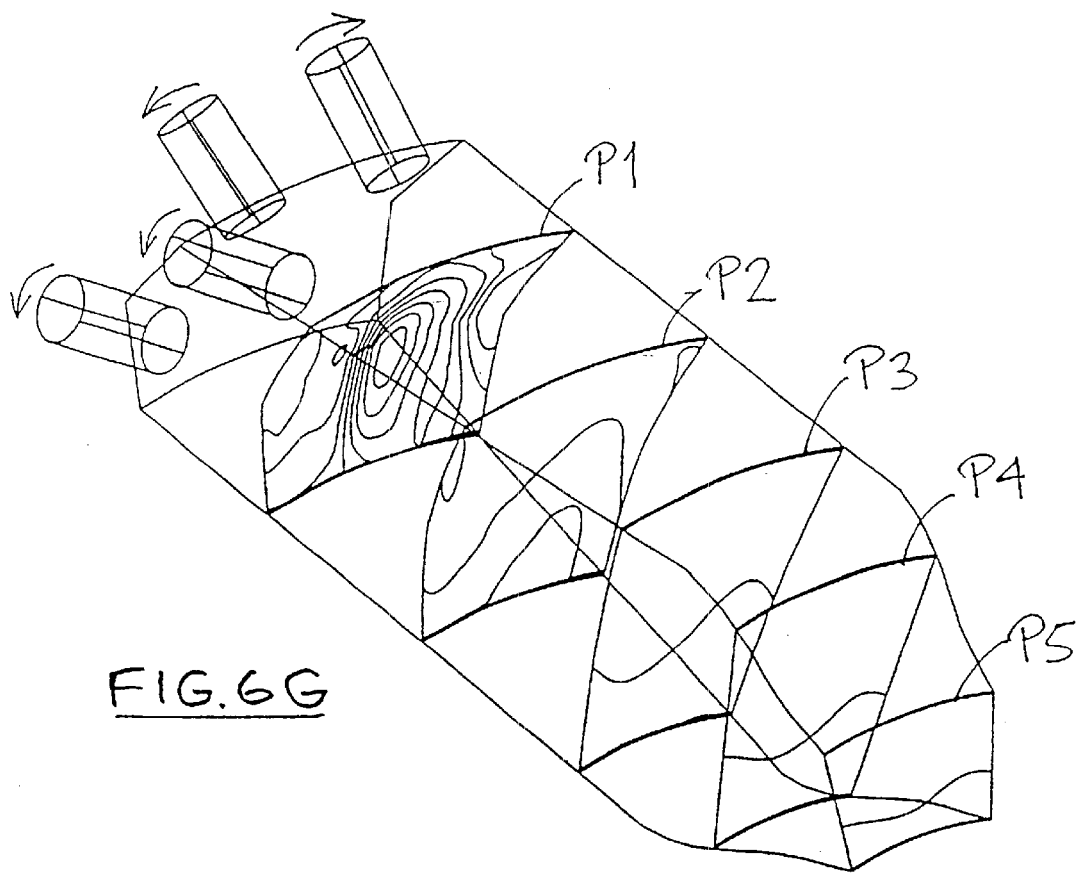

Comparing FIGS. 6A to 6G, it is evident that FIGS. 6A and 6D give the joint best result in terms of evenness of temperature distribution of the combustion gases at the combustor nozzle exit plane P5, but an inspection of the temperature distribution at plane P2 in these two figures shows that FIG. 6D seems to exhibit more thorough mixing of the combustor gases at an earlier stage in the combustion process, i.e., greater rapidity of mixing. If we now compare FIGS. 6A and 6D with FIGS. 5A and 5B, it will be seen that the angled injectors give the best results with regard to both the evenness of temperature distribution of the combustion gases at the combustor nozzle exit plane P5, and the rapidity of mixing.

The above results indicate that combustors with angled injectors in accordance with the present invention should enable more rapid mixing of the combustion products in the primary combustion zone, so enabling low emission, stable, premixed lean burn parallel staged combustion to be extended to lower powers than hitherto. Furthermore, such combustors should enable a more even temperature of the combustion products to be achieved on exit from the combustion nozzles, so easing the duty expected of the downstream turbine components. The results also indicate that the optimum swirl configuration for such combustors in terms of rapidity of mixing may be one in which the directions of swirl motion are opposite for adjacent injectors in each row.

Figure 7:
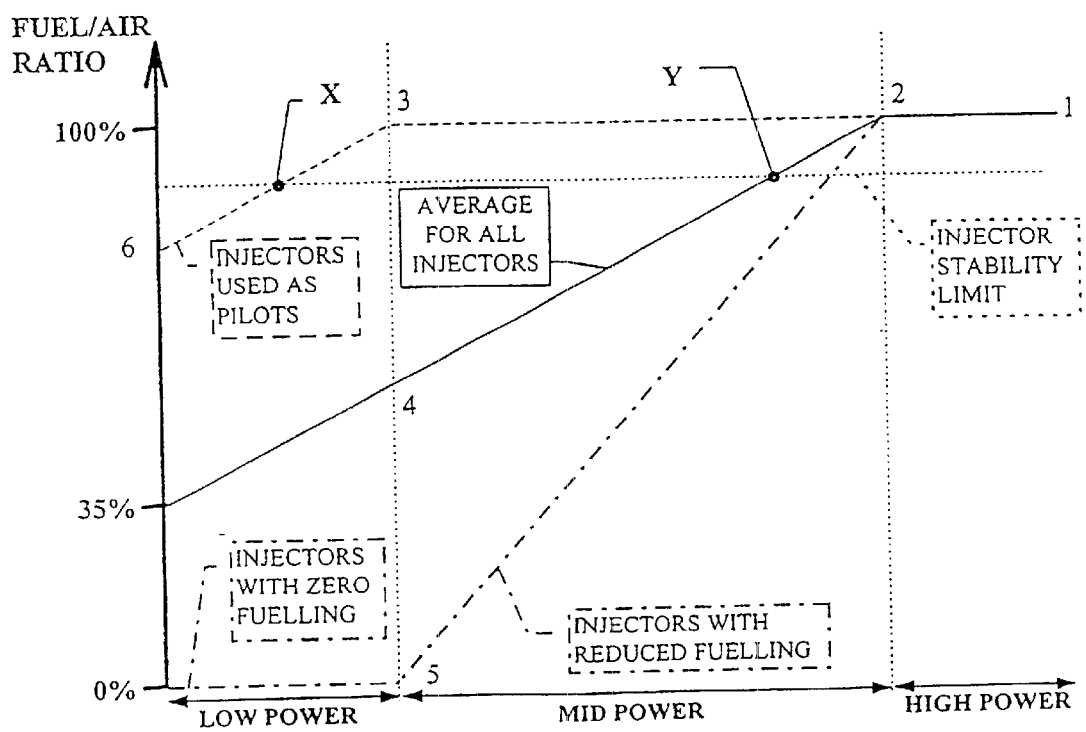
FIG. 7 is a graphical representation of the variations in injector fueling with engine power for the invention when used to provide fuel staged premixed lean burn combustion.

Turning now to FIG. 7, the operation of a combustor according to the invention, when used to provide fuel staged premixed lean burn combustion, will be described in relation to required variations in injector fueling. It should be understood that the graph of FIG. 7 is not to scale and is provided only for the purposes of qualitative description.

The graph shows three engine power ranges over which the combustor operates; low, medium and high powers. A "fuel turn-down" case will be considered, in which the power obtained from the engine is reduced by progressive reduction in the amount of fuel supplied to the combustor. Throughout the high power range, the combustor operates in a low-emissions combustion mode wherein all the injectors are fueled at a certain fuel/air ratio, designated here as "100%", such that they all sustain stable lean-burn combustion. As the power is reduced from point 1 to point 2, the low emissions combustion mode can be sustained by supplying equal amounts of fuel to all the injectors.

As power is progressively reduced through the mid-power range, the total amount of fuel delivered to the combustor is again progressively reduced. However, the fuel flow for, preferably, three out of each group of four injectors is maintained such that their fuel/air ratios remain constant at 100%, from point 2 to point 3, thereby maintaining stable combustion. At the same time, the amount of fuel passed to the remaining one out of each group of four injectors is progressively reduced relative to the others so that the fuel/air ratio of the reduced fuel injectors declines steeply from point 2 at the top of the mid-power range to point 5 at the bottom of the range. At point 5 the fuel flow to the injectors has effectively ceased and the fuel/air ratio is at or near zero. Although as power is reduced, the fuel/air ratio of the reduced fuel injectors and the average fuel/air ratio for all the injectors drop well below the limit of stability for the low emissions combustion mode, the stability of the overall combustion process remains uncompromised throughout the mid-power range because the stable combustion processes originating from the three out of four injectors, which operate at the relatively high fuel/air ratio, support the combustion processes originating from the reduced fuel injectors, thereby preventing instability from developing.

During operation of the parallel staged combustor over most of the low-power range, the fuel/air ratio of the three out of four injectors which are still supporting the combustion process is reduced along line 3–6 as their fuel supplies are reduced with reducing power. Point X on line 3–6 represents the point at which the lean-burn combustion process supported by these injectors would become unstable. To overcome this problem, at least some of the fuel injectors are fueled such that they locally produce a fuel/air mixture which is richer than that used for the low emissions combustion mode, though the average fuel/air ratio for all the actively fueled injectors remains on the line 3–6. By this means, local hot flame pilot combustion processes occur in the primary combustion zone to stabilize the overall combustion process during the transition between zero power and the true low emissions combustion mode.

It should be noted that the improved rapidity and completeness of mixing in the combustion process resulting from use of the present invention enables a low emissions combustion process to be sustained over a wider power range. Whereas in the prior art for two-row injector arrangements it is known to utilize one out of each group of six injectors to achieve stable low emissions combustion with fuel staging, the present invention allows the same results to be achieved by utilizing one out of each group of four, so achieving greater fuel and power "turn-down" before the low emissions combustion mode becomes unstable.

What is claimed is:

1. A combustor for a gas turbine engine, comprising:
   a) an annular combustion chamber having radially inner and outer concentric walls and a combustor head wall at an upstream end, and
   b) a plurality of fuel injectors disposed in the combustor head wall, the fuel injectors being circumferentially spaced around the combustor head wall and disposed as a first radially outer row of injectors and a second radially inner row of injectors, the rows being concentric with the combustor head wall, the injectors in the first and second rows being disposed such that injectors in one of the rows are in angular registration with spaces between injectors in the other row, each fuel injector including:
      i) means for producing a fuel/air mixture having a swirling motion,
      ii) a mixing duct located downstream of the means for producing the fuel/air mixture, the mixing duct opening into the combustion chamber through the combustor head wall and having a length sufficient to allow at least partial homogenization of the fuel/air mixture before entry to the combustion chamber as a divergent swirling stream,
      iii) the mixing ducts in the first and second rows of injectors having longitudinal axes oriented to coincide with generating rays of respective first and second imaginary conical surfaces, the conical surfaces intersecting within a primary combustion zone in the combustion chamber,
      iv) the mixing ducts located in different rows being angled towards each other in a downstream direction, and
      v) the divergent swirling streams of the fuel/air mixture coming from the different rows crossing in the combustion chamber in an interdigitating manner.

2. The combustor according to claim 1, in which the direction of swirl motion is the same for streams coming from all the injectors.

3. The combustor according to claim 1, in which the direction of swirl motion is the same for injectors in the same row as each other, but opposite for injectors in the different rows.

4. The combustor according to claim 1, in which the direction of swirl motion is opposite for adjacent injectors in each row.

5. The combustor according to claim 1, in which the first and second intersecting conical surfaces include an acute angle.

6. The combustor according to claim 5, in which the included angle between the first and second intersecting conical surfaces is between 30° and 50°.

7. The combustor according to claim 6, in which the included angle between the first and second intersecting conical surfaces is 40°.

8. A method of operating a combustor having a plurality of fuel injectors arranged as outer and inner rows concentric with a head wall at an upstream end of a combustion chamber, the combustor being adapted to support a lean-burn parallel-staged combustion process, the method comprising the steps of:
   a) operating the combustor in a low emissions combustion mode over a predetermined wide power range by fueling the injectors so as to produce a fuel-lean fuel/air mixture in a primary combustion zone;
   b) operating the combustor in a predetermined high-power part of a predetermined wide power range by providing substantially equal fueling of all the injectors at a substantially constant fuel/air ratio; and
   c) operating the combustor in a predetermined mid-power part of the predetermined wide power range by supplying a plurality of the injectors in at least one of the rows with progressively reducing quantities of fuel relative to the other injectors at a progressively reducing fuel/air ratio, the plurality of injectors in said at least one of the rows being equally spaced around said at least one row and interspersed with the other injectors in said row, and maintaining the remainder of the injectors at said substantially constant fuel/air ratio, whereby the injectors with the greater fueling sustain the whole combustion process within the combustor in a low emissions combustion mode.

9. The method of operating a combustor according to claim 8, in which the plurality of injectors comprise one out of each group of four adjacent injectors.

* * * * *